US009441973B2

United States Patent
Bandyopadhyay et al.

(10) Patent No.: US 9,441,973 B2
(45) Date of Patent: Sep. 13, 2016

(54) IRREGULAR FEATURE MAPPING

(71) Applicant: TRX Systems, Inc., Greenbelt, MD (US)

(72) Inventors: Amrit Bandyopadhyay, College Park, MD (US); Brian Beisel, Ellicott City, MD (US); John Karvounis, Bowie, MD (US); Benjamin Funk, Hanover, MD (US); Carole Teolis, Glenn Dale, MD (US); Christopher Giles, Prince Frederick, MD (US)

(73) Assignee: TRX Systems, Inc., Greenbelt, MD (US)

(*) Notice: Subject to any disclaimer, the term of this patent is extended or adjusted under 35 U.S.C. 154(b) by 449 days.

(21) Appl. No.: 13/916,487

(22) Filed: Jun. 12, 2013

(65) Prior Publication Data
US 2015/0354965 A1     Dec. 10, 2015

Related U.S. Application Data

(60) Provisional application No. 61/658,883, filed on Jun. 12, 2012.

(51) Int. Cl.
| | |
|---|---|
| *H04W 64/00* | (2009.01) |
| *G01C 21/30* | (2006.01) |
| *G01C 21/12* | (2006.01) |
| *G01C 21/16* | (2006.01) |
| *G01C 21/20* | (2006.01) |
| *G01S 5/02* | (2010.01) |

(52) U.S. Cl.
CPC ............ *G01C 21/12* (2013.01); *G01C 21/165* (2013.01); *G01C 21/206* (2013.01); *G01S 5/0205* (2013.01); *G01S 5/0263* (2013.01); *H04W 64/00* (2013.01); *G01S 5/0268* (2013.01)

(58) Field of Classification Search
CPC ... G01S 13/723; G01C 17/38; G01C 21/165; G01C 21/005; G01C 21/3446; G01C 21/30; A61H 3/061; G06T 11/203; H04W 64/00
USPC ......... 701/469, 494, 500, 533, 28, 445, 446; 342/70; 345/419; 370/338
See application file for complete search history.

(56) References Cited

U.S. PATENT DOCUMENTS

| | | | |
|---|---|---|---|
| 4,939,663 A * | 7/1990 | Baird .................. | G01C 21/005 342/64 |
| 6,024,655 A | 2/2000 | Coffee | |

(Continued)

FOREIGN PATENT DOCUMENTS

| | | |
|---|---|---|
| WO | WO 2012/050932 A1 | 4/2012 |
| WO | WO 2012/072957 A1 | 6/2012 |

OTHER PUBLICATIONS

U.S. Appl. No. 13/566,956, filed Aug. 3, 2012, Karvounis.

(Continued)

*Primary Examiner* — Tuan C. To
*Assistant Examiner* — Yuri Kan
(74) *Attorney, Agent, or Firm* — Baker & Hostetler LLP

(57) ABSTRACT

Disclosed herein are methods and systems for mapping irregular features. In an embodiment, a computer-implemented method may include obtaining tracking data that has dead reckoning tracking data for a tracked subject along a path and performing shape correction on the tracking data to provide a first estimate of the path.

16 Claims, 16 Drawing Sheets

(56) References Cited

U.S. PATENT DOCUMENTS

| | | |
|---|---|---|
| 6,560,531 B1 | 5/2003 | Joshi |
| 7,299,056 B2 | 11/2007 | Anderson |
| 7,890,262 B2 | 2/2011 | Judd et al. |
| 8,032,153 B2 | 10/2011 | Dupray et al. |
| 8,145,419 B2 | 3/2012 | Onome et al. |
| 8,150,650 B2 | 4/2012 | Goncalves et al. |
| 8,331,335 B2 | 12/2012 | Chhabra |
| 8,462,745 B2 | 6/2013 | Alizadeh-Shabdiz |
| 8,473,241 B2 | 6/2013 | Foxlin |
| 8,538,687 B2 | 9/2013 | Plocher et al. |
| 8,712,686 B2 | 4/2014 | Bandyopadhyay et al. |
| 9,014,903 B1* | 4/2015 | Zhu .................. G01C 21/3446 382/103 |
| 2002/0044081 A1* | 4/2002 | Cong .................. G01S 13/723 342/70 |
| 2002/0065603 A1* | 5/2002 | Watanabe ............. G01C 21/30 701/446 |
| 2007/0121560 A1* | 5/2007 | Edge .................... H04W 64/00 370/338 |
| 2008/0077326 A1* | 3/2008 | Funk .................. G01C 21/165 701/500 |
| 2008/0125958 A1 | 5/2008 | Boss et al. |
| 2008/0186234 A1 | 8/2008 | Alles et al. |
| 2009/0043504 A1* | 2/2009 | Bandyopadhyay .... G01C 17/38 701/469 |
| 2009/0303120 A1 | 12/2009 | Alizadeh-Shabdiz |
| 2009/0322603 A1 | 12/2009 | Liao |
| 2010/0305845 A1* | 12/2010 | Alexandre ............ A61H 3/061 701/533 |
| 2011/0117924 A1 | 5/2011 | Brunner et al. |
| 2011/0172906 A1 | 7/2011 | Das et al. |
| 2011/0182238 A1 | 7/2011 | Marshall et al. |
| 2011/0238308 A1 | 9/2011 | Miller et al. |
| 2012/0021764 A1 | 1/2012 | Enright |
| 2012/0143495 A1 | 6/2012 | Dantu |
| 2013/0179067 A1 | 7/2013 | Trowbridge et al. |
| 2013/0278594 A1* | 10/2013 | Kaatz ................... G06T 11/203 345/419 |
| 2013/0293416 A1 | 11/2013 | Waters et al. |
| 2013/0311134 A1 | 11/2013 | Kordari et al. |
| 2013/0331121 A1 | 12/2013 | Bandyopadhyay et al. |
| 2013/0332064 A1 | 12/2013 | Funk et al. |
| 2013/0332065 A1 | 12/2013 | Hakim et al. |

OTHER PUBLICATIONS

U.S. Appl. No. 13/616,350, filed Sep. 14, 2012, Bandyopadhyay et al.

U.S. Appl. No. 61/658,883, filed Jun. 12, 2012, Bandyopadhyay et al.

U.S. Appl. No. 61/783,799, filed Mar. 14, 2013, Karvounis et al.

U.S. Appl. No. 61/783,908, filed Mar. 14, 2013, Funk et al.

U.S. Appl. No. 61/792,856, filed Mar. 15, 2013, Funk et al.

* cited by examiner

IRREGULAR FEATURE MAPPING

CROSS REFERENCE TO RELATED APPLICATIONS

This application claims the benefit of U.S. Provisional Application No. 61/658,883, filed Jun. 12, 2012, titled "Advanced Navigation Engine." The contents are hereby incorporated by reference in its entirety.

GOVERNMENT RIGHTS

The subject matter disclosed herein was made with government support under contract number DARPA SBIR Phase II-W31P4Q-10-C-0166 awarded by the Defense Advanced Research Projects Agency. The Government may have certain rights in the herein disclosed subject matter.

INCORPORATION BY REFERENCE

This application address concepts discussed in the following previously-filed applications: "Method and System for Locating and Monitoring First Responders," U.S. Patent Publication Serial Number 2008/0077326, May 31, 2007; "Methods Resolving the Elevation of a Tracked Personnel or Assets," U.S. Provisional Patent Application Ser. No. 61/783,799, filed Mar. 14, 2013; "Methods for Improved Heading Estimation," U.S. Provisional Patent Application Ser. No. 61/783,908, filed Mar. 14, 2013; "System and Method for Locating, Tracking, and/or Monitoring the Status of Personnel and/or Assets Both Indoors and Outdoors," U.S. patent application Ser. No. 13/616,350, filed Sep. 14, 2012; and "System and Method for Localizing a Trackee at a Location and Mapping the Location Using Inertial Sensor Formation," U.S. patent application Ser. No. 13/852,649, filed Mar. 28, 2013. The aforementioned applications in their entirety are incorporated by reference.

TECHNICAL FIELD

The technical field generally relates to a system and method for locating, tracking, and/or monitoring the status of personnel or assets, both indoors and outdoors.

BACKGROUND

Derived relative motion information, which uses a dead reckoning process, is subject to cumulative error. Thus a tracking system relying on dead reckoning alone may have a continuous decrease in accuracy, which makes derived relative motion information not trustworthy over long periods of time. Many other aiding sensors have been considered including ranging and optical based mapping systems.

The user track and map information that is acquired by use of multiple sensors is combined so that the map information can compensate for dead reckoning, e.g. inertial, drift while user motion/track information can allow perceptually aliased feature information to be disambiguated.

SUMMARY

Disclosed herein are methods and systems for mapping irregular features. In an embodiment, a computer-implemented method may include obtaining tracking data that has dead reckoning tracking data for a tracked subject along a path and performing shape correction on the tracking data to provide a first estimate of the path.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION OF ILLUSTRATIVE EMBODIMENTS

Figure 1:
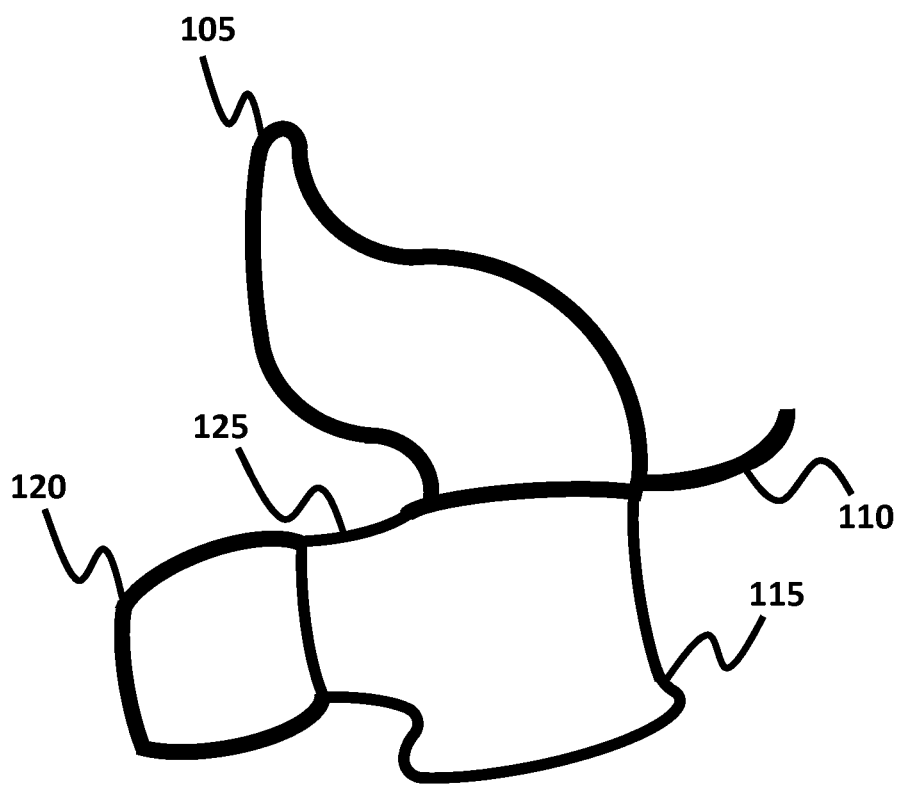
FIG. 1 illustrates tracks of multiple tracked subjects as they walk together into and over a tunnel structure.

Low cost inertial sensors alone have insufficient accuracy to provide infrastructure free tracking over extended periods. System accuracy can generally be improved by typically higher cost hardware or signal processing algorithms that incorporate sensor redundancy and other external information. The latter approach is disclosed herein, which allows the delivery of high performance devices at relatively low prices. Algorithms have been designed to constrain or eliminate inertial errors that tend to accumulate in GPS denied environments. These algorithms may use path histories, geospatial constraints, inter-asset relationships, and other applicable external information.

Also, algorithms have been developed for in building tracking that is able to infer environmental structure based on measurements of the tracked subject's motion and using GIS building footprint information, if available.

For example, in buildings, the existence of a hallway might be inferred if a subject moves for a long period in a confined straight area. Climbing might indicate the presence of a stairwell and an elevation change without climbing might infer an elevator. For each inferred feature, its estimated location and orientation are known from the sensor measurements. These geospatial constraints placed on the navigation solution can mitigate the accumulation of inertial dead reckoning errors. Postulated knowledge of hallways and other building grid constraints may be enforced on the navigation solution to yield an effective angular drift correction. Revisiting a known elevator or a stairwell, likewise, enables a location correction.

In buildings, rigid assumptions can be made on their architecture to aid in identifying building features and the underlying map. These same assumptions do not necessarily hold in natural environmental structures, such as caves. But caves do have a rigid structure that can be mapped. Disclosed herein are methods that enable discovery and mapping of features in natural and manmade structures. The disclosed methods also enable improved tracking in non-rectangular buildings and other irregular unknown shape structures. Similar to the in-building algorithms, a feature map of the area is created that can be used for corrections.

Variations of this method exist. In the examples contained herein, these methods are applied to shape matching in 2-D. The matching criteria may be extended to consider the z location along the path at the same time. The method is similarly applicable to matching path elevation shapes to a given terrain elevation data set. Often the elevation data sets available online do not have fine resolution (they are sampled in x, y and z over a coarse grid) so methods discussed herein for coarse matching would be applicable.

With respect to developing a generic structural mapping capability, elevation tracking and automated detection of entry into a structured environment are issues. Even without pre-existing information of the environment (e.g., building footprint location and shape information), transitions to structured natural environments may be detected and mapped. The structured natural environments may be detected by using sensors, for example, to detect the reduction in signal strength of GPS, changes in satellite geometry, changes in light, changes in magnetic field variation or the like. By adding the ability to handle naturally varying elevation and potentially irregular (non-linear) shapes, the goal is to move away from rigid building structures to a "terrain", where terrains can be natural or man-made and may have varying elevation rather than discrete levels as in buildings.

FIG. 1 shows the tracks of multiple tracked subjects as they walk together into and over a tunnel structure. FIG. 1 shows the output of an automated transition detection cortex. The relatively light colored/thin segments, such as segment 115 and 125 denote segments where the tracks are classified as in a "structured environment," while the relatively dark segments, such as 105, 110, and 120, of the track are classified as outdoors or in an "unstructured environment."

The method of hierarchical shape matching segments the subject's dead reckoning path into combinations of lines and identifies potential matches based on segment descriptors and path shape. The descriptors contain information on the segment length, width, and other segment signature data. The algorithm is hierarchical and performs adaptive segmentation and then matching at what could be thought of as different zoom levels that are selected dependent on the path length. Coarse segmentation is performed and potential matches are made, then finer segmentation of the matched segments is performed in order to improve the accuracy of the match (or to reject it). Estimates of inertial track error are used to limit the corrections and the search space. Higher quality matching criteria are required for larger assumed errors. Other sensor signatures can be compared for potential segment matches and factored in to the match probabilities for a given location. The methods work on the same concepts as human pattern recognition capabilities in that they match at varying resolutions and allow partial shape matches.

Figure 2:
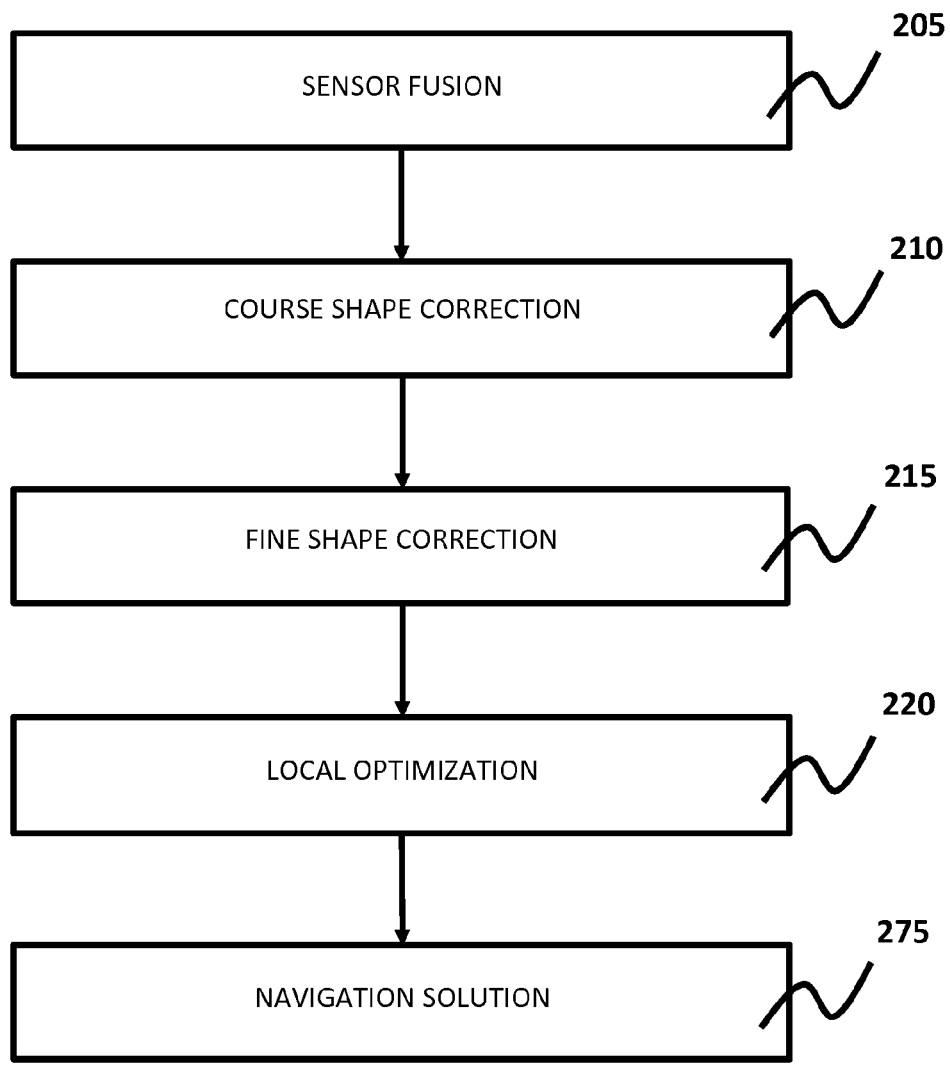
FIG. 2 illustrates a non-limiting, exemplary method of implementing hierarchical shape matching.

FIG. 2 illustrates a non-limiting, exemplary method 200 of implementing hierarchical shape matching. In summary, the algorithm includes sensor fusion 205, coarse shape corrections 210, and fine shape corrections 215. Sensor fusion 205 corrections (e.g., inertial, compass, pressure) are performed to get the best estimate of the dead reckoning path. The best estimate of the path can be obtained using constraint-based optimization, for example. Constraint-based optimization may include obtaining tracking data, such as data from a dead reckoning sensor of a tracked subject, obtaining constraints, and then using a convex optimization method on the constraints and the tracking data. Any of a plurality of known methods for sensor fusion may be used.

For coarse shape corrections 210 the path is described by a set of linear segments with width less than a certain threshold which may be adapted based on the distance covered by the path. More details are given below when discussing path segmentation. Shapes consist of a series of segments. And new shapes in the path are attempted to be matched to prior path shapes within the error bounds of the tracked subject. Matches provide corrections which reduce error overall. With regard to fine shape corrections 215, the coarse shape corrected path is described by a set of linear segments with a width less than a certain lower threshold. Again, new shapes in the path are attempted to be matched to prior path shapes within the error bounds of the tracked subject. The goal is to fine tune the coarse corrections. If shapes do not match at the finer resolution, the coarse corrections may be reversed.

Path segmentation is based on the concept of dividing the path into stretches of straight walking or stretches that can be contained in a straight area of a certain width or with a deviation from the best fit line less than a threshold. Lines are chosen because shape matching techniques based on lines are efficient and relatively complicated logic can be simplified using straight line approximations. Additionally, segmenting in higher width segments allows a view of a lower resolution path which is similar to the approach human pattern recognition might follow when scanning for a match. While lines are chosen herein, other shape functions may be used to approximate the data, for example, polynomial approximations.

Path segmentation may be adapted to the distance covered by the path within the structure. For example, in office buildings which have relatively small total distance covered (e.g., 10's of meters) in one embodiment the threshold width is initialized at 2 meters because hallways are typically this wide in office buildings. In a house which is smaller, the width may be initializes at 1 meter. If a path covers several kilometers, the width of the segments can be adapted to be larger (e.g. 5 meters to 15 meters) providing a more coarse segmentation in the coarse matching allows for larger segments and for some of the more fine detail of the path to be ignored on the first matching.

All of the detected shape features can feed into simultaneous localization and mapping (SLAM) algorithms which can provide corrections based on the shape location estimate when a shape is revisited. These SLAM algorithms search through the detected shapes comparing each to determine if there is a match. It makes sense to limit the search for potential matches to those shapes whose location estimates fall within the estimated error bound of the newly discovered shape feature. Regardless of the error bound, if the correction distance is high (for example, 10's of meters) (which may be the case in very long paths after significant time has passed) it makes sense to require a higher quality match, which may consist of requiring a higher amount of overlap of the shapes.

With regard to path features, features with the same path shape over several of the linear segments are considered. A match is determined by measuring the quality of the shape overlap, which is the amount of overlap between an input set of lines and a base set of lines. Overlap does not need to be 100%. A person may have walked a slightly different path so some lines in a base pattern may not have any overlap. On the other hand a person may have walked back and forth in one area of the map so some lines in the base pattern could have multiple segments overlapping them. The changes in orientation and offset needed to obtain the maximum overlap also feed into the match quality.

Figure 4:
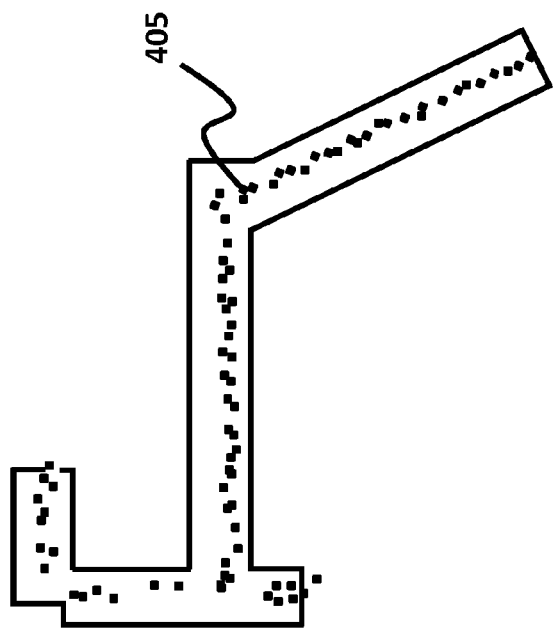
FIG. 4 illustrates an aligned shape based on misaligned shapes of FIG. 3.
Figure 3:
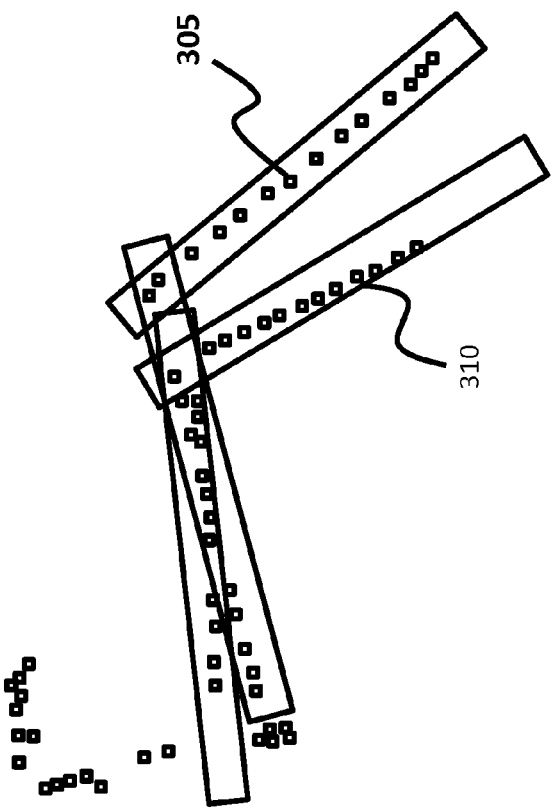
FIG. 3 illustrates misaligned shapes.

The shape matching algorithms may also include sensor profile matching. For example, magnetic heading data (which could be ±180 degrees rotation may account for walking through an area in the opposite direction) may be combed with shape matching to increase confidence of a good match. FIG. 3 and FIG. 4 show an example of a good match. Shape 305 is a rotation and translation of shape 310. The misalignment is caused by inertial drift. When the drift is removed the underlying map is evident and we get shape 405.

A test was conducted in caverns to test the ability of the algorithms to correct errors when tracking using low cost sensors. The tracking device contained three axis accelerometers, gyroscopes (poorly calibrated to challenge the algorithms), a magnetometer, and a barometric pressure sensor. The tracks were initialized at a known starting location then continued for about 2 kilometers (in and out of the cavern) in fully GPS denied conditions.

Figure 6:
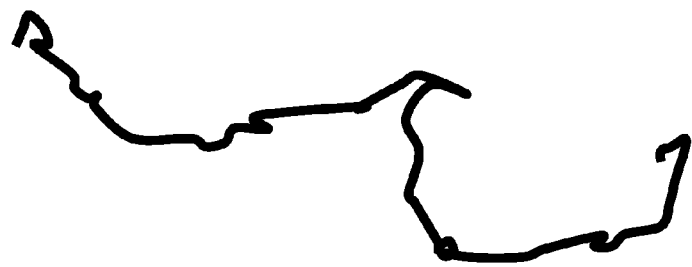
FIG. 6 illustrates a reported inertial path.
Figure 5:
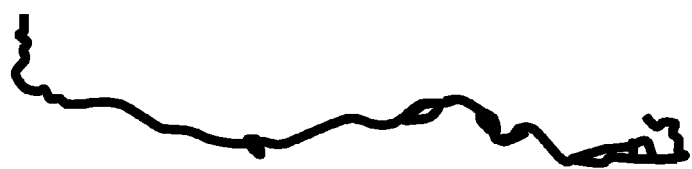
FIG. 5 illustrates a ground truth path shape.

FIG. 5 shows the ground truth path shape and FIG. 6 shows the reported inertial path. The inertial path was initialized at the starting location and the heading was arbitrarily set to zero when the tracking unit was turned on. Sensor bias is seen as a drift factor (in the test it was 0.086) that causes the path to open up.

Figure 8:
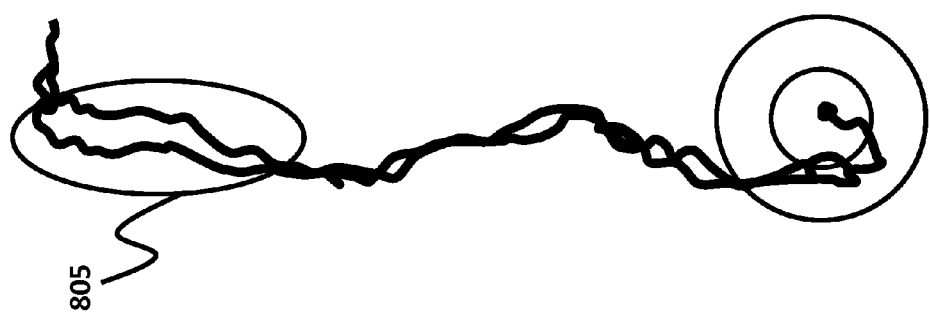
FIG. 8 illustrates improvements to a dead reckoning path after coarse shape corrections.
Figure 7:
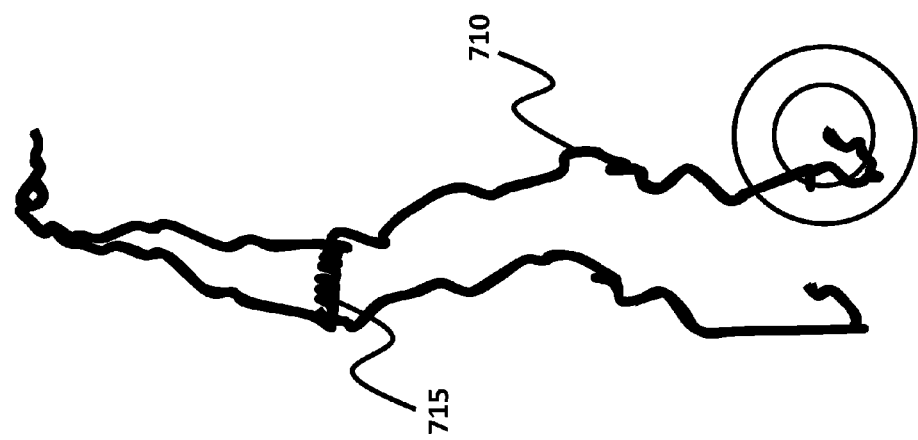
FIG. 7 illustrates improvements to a dead reckoning path after sensor fusion corrections.

FIG. 7 shows the improvements after sensor fusion corrections. Line 710 is a representation of the inertial path of FIG. 7 after sensor fusion corrections. After sensor fusion, the path still has slight drift errors which result in location errors in the middle section of the path of 91.85 meter as indicated by the line 715. The path in should overlap the path out almost completely as shown in the ground truth path of FIG. 5. At the end point the error was 176 meters (the end points should match). FIG. 8 shows the inertial path in and out of the cavern after coarse shape corrections. The errors are significantly reduced, but the path has been distorted so that the errors increase in one section, as indicated by oval 805.

Figure 11:
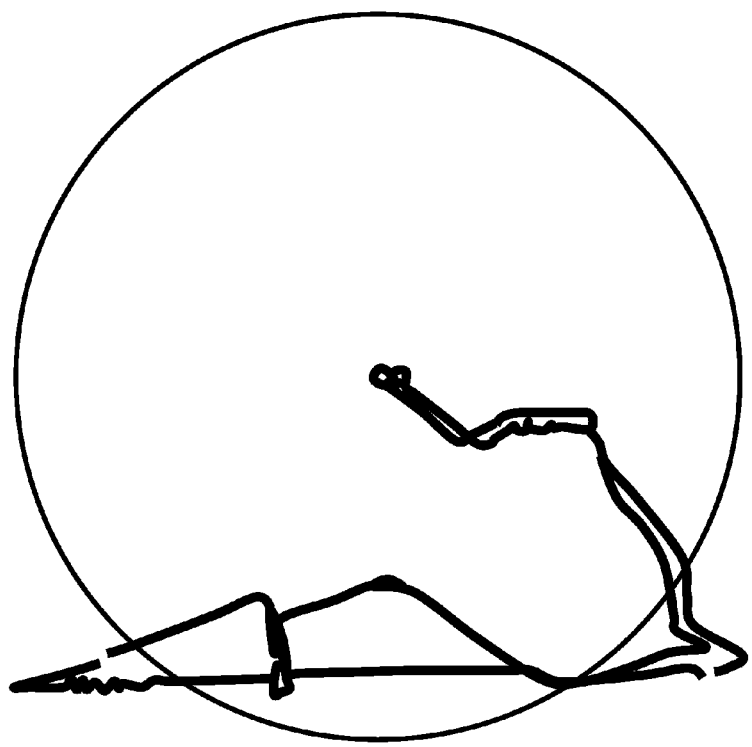
FIG. 11 illustrates a portion of a dead reckoning path after fine shape feature corrections.
Figure 10:
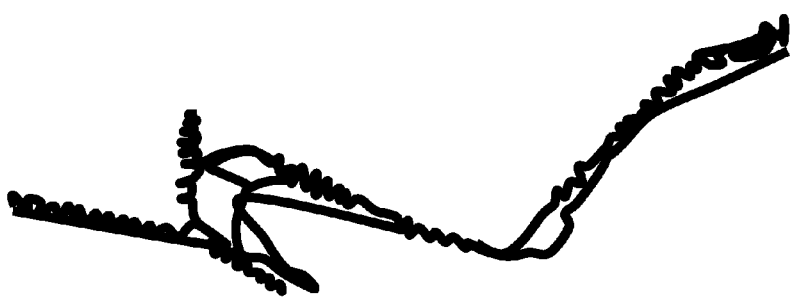
FIG. 10 illustrates close-up views of portions of the dead reckoning path of FIG. 9.
Figure 9:
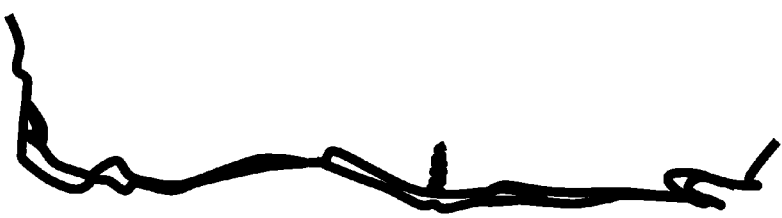
FIG. 9 illustrates a portion of a dead reckoning path after fine shape feature corrections.

FIG. 9 illustrates a portion of the inertial path after fine shape feature corrections. FIG. 10 and FIG. 11 show close-up views of portions of the inertial path in the center (error was 91.85 m before corrections), and at the end, (error was 176 m before corrections). At this point residual relative errors in the path were about 10 meters in the center and the end point error was less than 3 meters.

Figure 12:
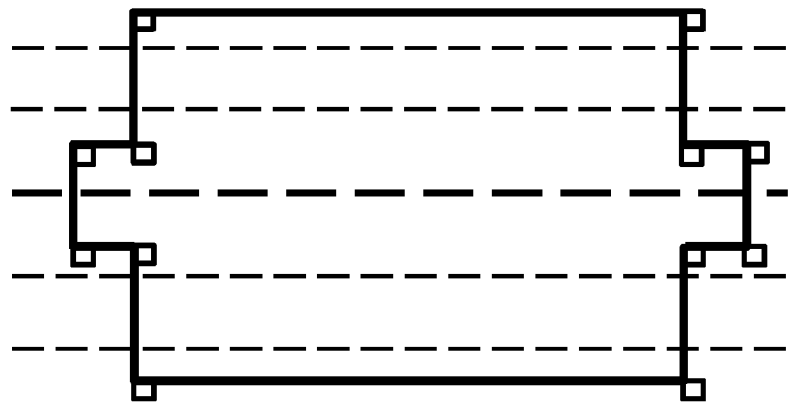
FIG. 12 illustrates a rectangular building with lines indicating probable grid direction.

In a building or other structure the footprint (outline of the structure) is usually known. Information can be inferred about the most probable orientation of hallways. For example, in a rectangular structure, hallways are likely to be aligned along directions parallel to the edges of the structure. Thus a grid is defined in the direction of the longest edge of the building indicating that and the most probable hallway directions will be either parallel or perpendicular to the grid direction, as shown in FIG. 12. In slightly more complex buildings, there may be wings with different grids, as shown in FIG. 13 or non-rectangular shapes, as shown in FIG. 14.

Figure 13:
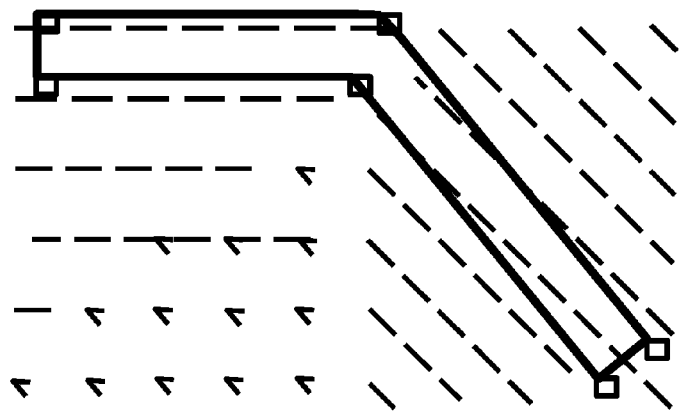
FIG. 13 illustrates a multi-grid building with lines indicating probable grid direction.
Figure 14:
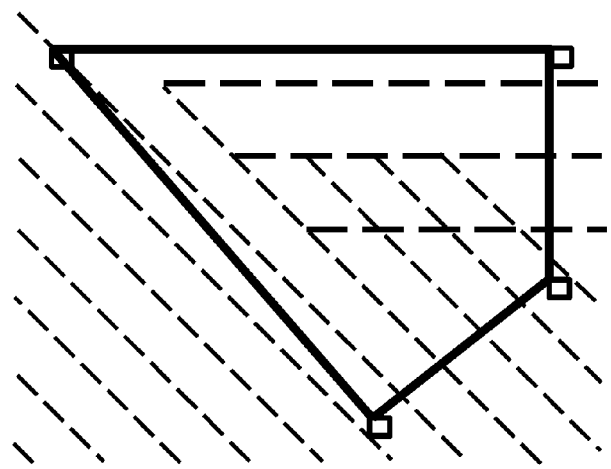
FIG. 14 illustrates a multi-grid building with lines indicating probable grid direction.

In the aforementioned cases of FIG. 12-FIG. 14, it is relatively easy to determine the most probable grid directions. Even in irregularly shaped structures, information can be derived from the outline. The process for determining the most probable grid may be automated. For example consider the building outline shown in FIG. 15. The building outline is partitioned into varying length straight segments whose vertices are indicated by black dots along the outline. The curved portion 1505 has several vertices to create the straight line segments. The most probable grid direction can be determined, for example, by spawning lines from an interior point in all headings/directions, and finding the outline segment that intersects each of the spawned lines without obstruction (e.g., line of sight ray tracing). The distances from the interior point to the outline, weighted by the length of the intersected outline segment for all the spawned lines can be used to create a histogram of the possible grid headings for the point.

Figure 15:
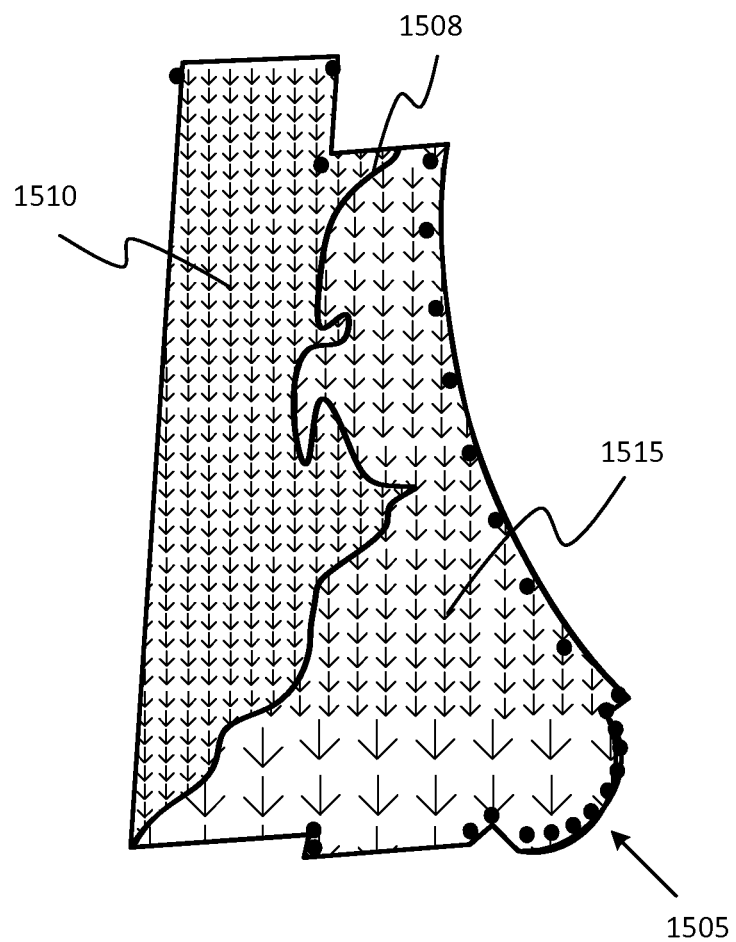
FIG. 15 illustrates a building grid angle partition in an irregularly shaped building.

FIG. 15 illustrates the most probable grid headings computed in this manner. The arrows on the left side of line 1508 and indicated by 1510 show an area where there is generally high probability of a single grid (length of the arrow is proportionate to the probability of the grid direction prediction). The arrows on the right side of line 1508 and indicated generally by 1515 show areas of higher probabilities of curved or multi-grid headings indicated with smaller arrows and multiple arrows at the same point. In FIG. 15, the arrows within the building outline may be color coded (e.g., red and green) to easily display the probabilities of curved and straight line. When considering the most probable heading of a long segment when multiple grids are possible, the probable headings at multiple points in the segment may be computed (e.g. start, end, center) and normalized across multiple points.

Figure 16:
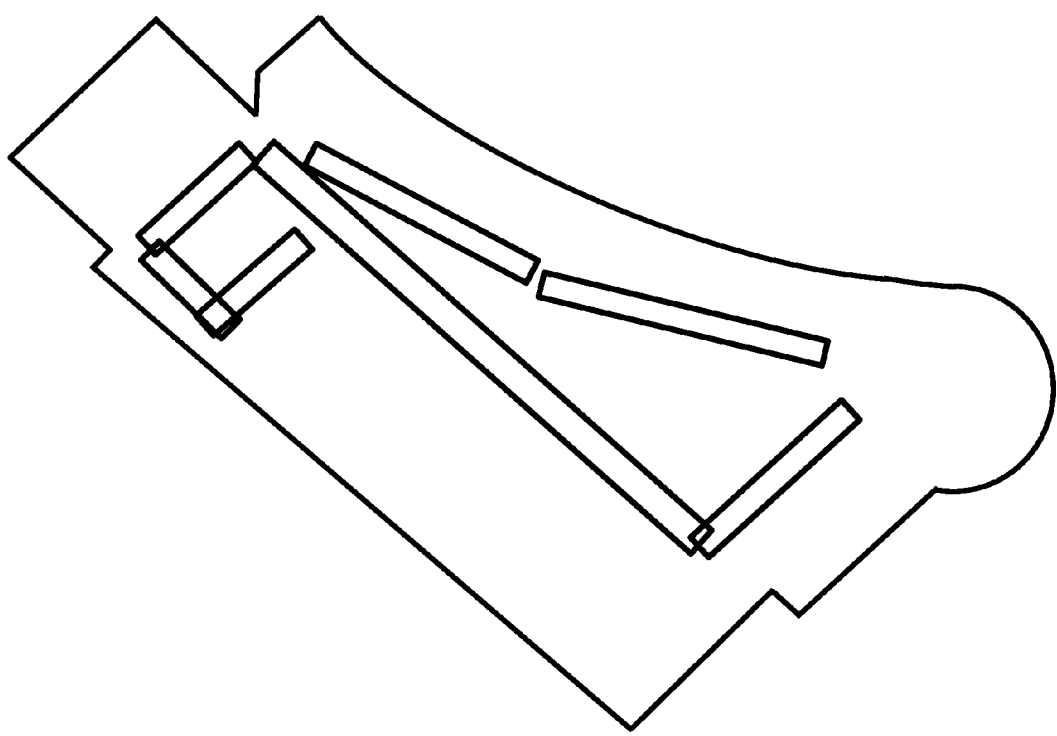
FIG. 16 illustrates an approximate layout of hallways in a building.
Figure 17:
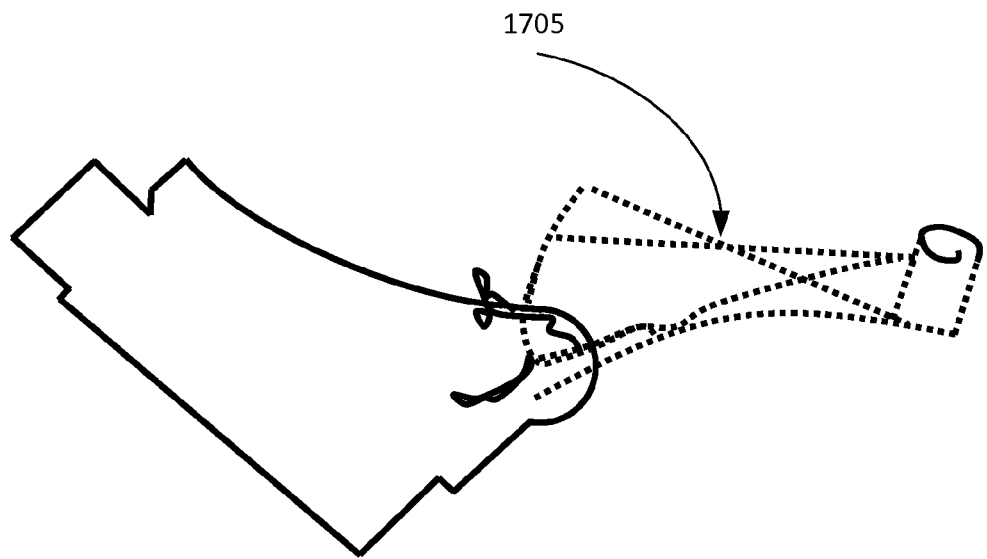
FIG. 17 illustrates inertial path data in conjunction with a building outline.
Figure 18:
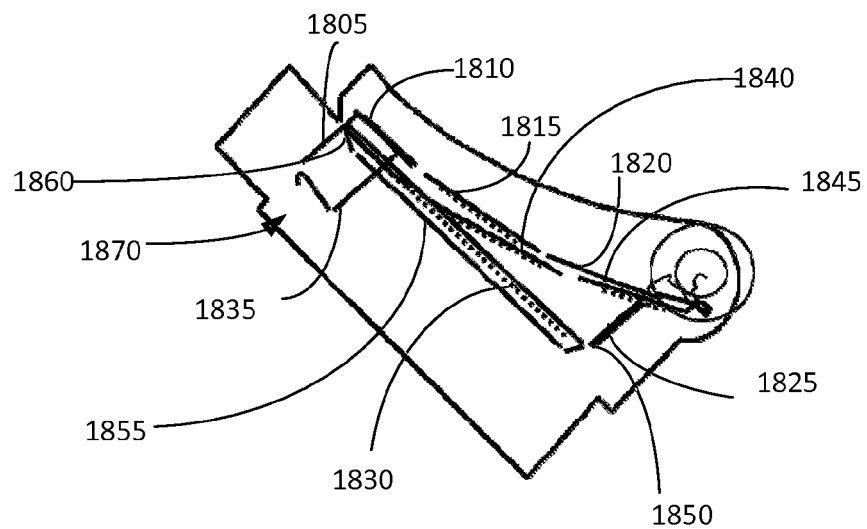
FIG. 18 illustrates results of a shape matching algorithm aided by building grid information.

Using this type of heading likelihood information is helpful when magnetic interference is present, which is the case inside most buildings. Consider a path in this irregularly shaped building in FIG. 16. FIG. 16 shows an approximate layout of the building hallways. Building hallway information is not used in the algorithm, but the building outline information is used. In a conducted test, a tracked subject makes two laps around the structure. FIG. 17 shows the inertial path data 1705 with the start point set to the correct location and the heading set to zero in the direction the subject was facing when the device was turned on. It is clear that heading and corrections are needed. Note the ambiguity between the building curvature and the amount of drift in the path. FIG. 18 shows the results of the shape matching algorithm aided by the building grid information. In this case since the track is contained in an area that is only 10's of meters, only the fine shape corrections are needed. The line segments are overlaid on the path to show the segmentation used in the matching. Group 1 which includes segments 1805, 1810, 1815, 1820, 1825, 1830, and 1835 and group 2 segments 1840, 1845, 1850, 1855, and 1860 define the two shapes that have been matched. There is only partial overlap since the rectangular section 1870 of the path in the upper left corner of the figure was traversed only once.

Figure 19:
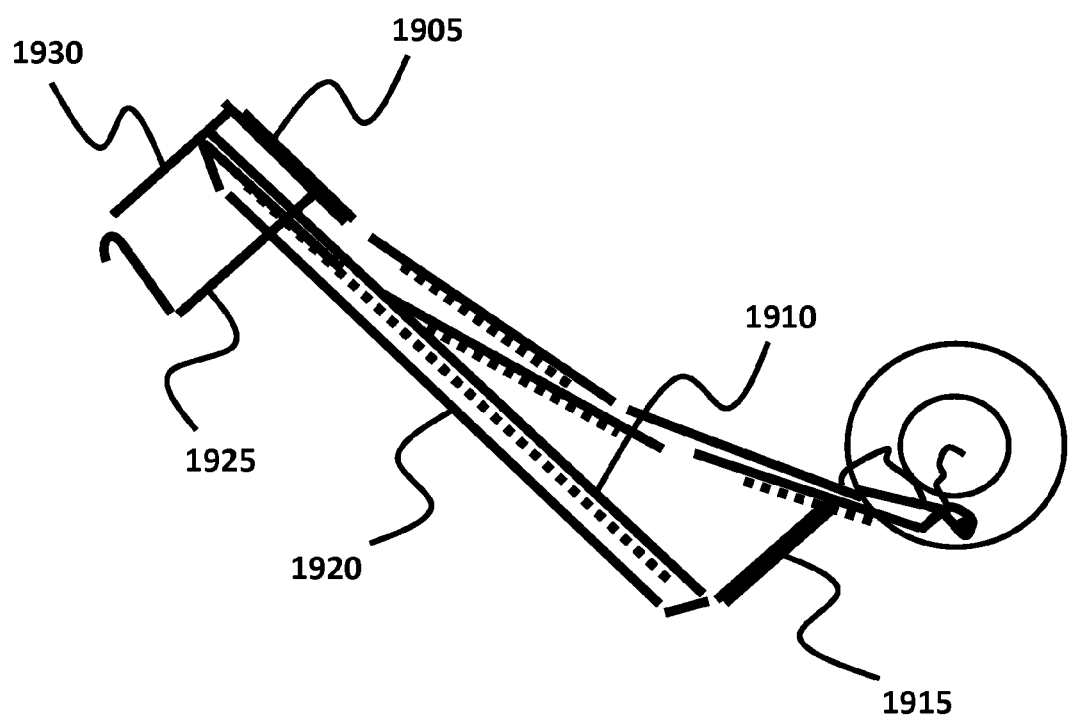
FIG. 19 illustrates results dead reckoning path without grid information of a building.

The same algorithms can be used without the probable grid information when building footprints are not available. The segments that are detected to be in a structure and are approximately perpendicular to each other are grouped. This is done first because in the majority of manmade structures rectangular shapes predominate. In FIG. 19, the perpendicular segments are segments 1905, 1910, 1915, 1920, 1925, and 1930. The heading estimates from each of these perpendicular segments are analyzed to estimate the combined orientation. Heading agreement from these segments reflects positively on the confidence that this is the grid heading of the underlying structure. Without information on the structure outline, shifting the shapes to match orientation may be less accurate. In this case since the tracked subject walked the same set of hallways the magnetic signatures matched and the confidence in the heading was high so the results are very similar. FIG. 19 shows the results without grid information.

Hierarchical shape matching was run in post processing mode. In other words, there was access to the entire track before beginning the processing. It was desirable to implement a method for irregular shape matching that could run in real-time or near real-time. In the port to run real-time, some significant changes were made to the approach in order to reduce computational complexity. A method for selecting shape features was developed that put more emphasis on uniqueness and this had the added benefit of improved robustness.

Figure 20:
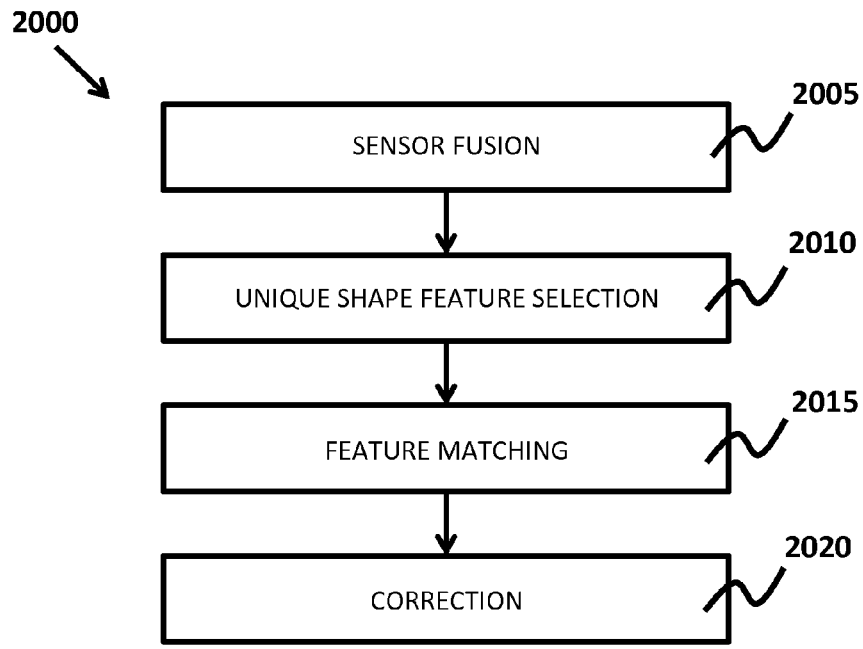
FIG. 20 illustrates a non-limiting, exemplary method of implementing shape matching with reduced complexity.

FIG. 20 illustrates a non-limiting, exemplary method 2000 of implementing shape matching with reduced complexity. In summary, hierarchical shape matching with reduced complexity includes sensor fusion 2005, unique shape feature selection 2010, feature matching 2015, and correction 2020. Sensor fusion 2005 corrections (e.g., inertial, compass, pressure) are performed to get the best estimate of the path. The best estimate of the path can be obtained using constraint-based optimization, for example.

Constraint-based optimization may include obtaining tracking data, such as data from a dead reckoning sensor, of a tracked subject, obtaining constraints, and then using convex optimization method on the constraints and the tracking data. Any of a plurality of known methods for sensor fusion may be used. The real-time feature extraction and matching proceeds after sensor fusion algorithms have been run to determine the best globally corrected path. That is the path with best global offset, rotation, drift, and scale are already computed based on available information. For unique shape feature selection 2010, the path is processed to extract uniquely shaped segments.

To be considered unique several criteria must be met. First, the shapes length, L, must be longer than a minimum threshold length. In an embodiment 10 meters was chosen to insure structural features were picked and not points in a path that have unique motion, but are confined to a small space. Being confined to a small space may occur when a person with a tracking device loiters in an area. In an embodiment, a section of a path is considered unique when the standard deviation of vector of heading angle changes over a section of path, $\sigma$, is greater than a threshold, for example 0.1 radians. Additionally, in an embodiment the Ramer-Douglas-Peucker algorithm is used to approximate the feature with a series of points joined by straight lines where the distance of the original feature from the approximation is never greater than epsilon. The more points that are needed to describe a shape for a given epsilon, the more unique the shape. When applied with a given epsilon (e.g., epsilon of one meter) the feature is considered unique only if the algorithm uses more than a minimum number of points. For example the minimum number of point may be 3, which would be only be possible for features are not straight lines since straight lines are not unique. Once a unique shape is found (i.e., once a section of path satisfies the above unique criteria) a vector of heading changes $f_A=[f_{A1}, \ldots f_{An}]$ over the duration of the feature is saved to describe the feature. Here we describe using shape data but this method applies directly to using other sensor signature data including using vectors of magnetic data, signal strength, or other environmentally linked data elements, or combinations of these data in the feature vector.

Figure 21:
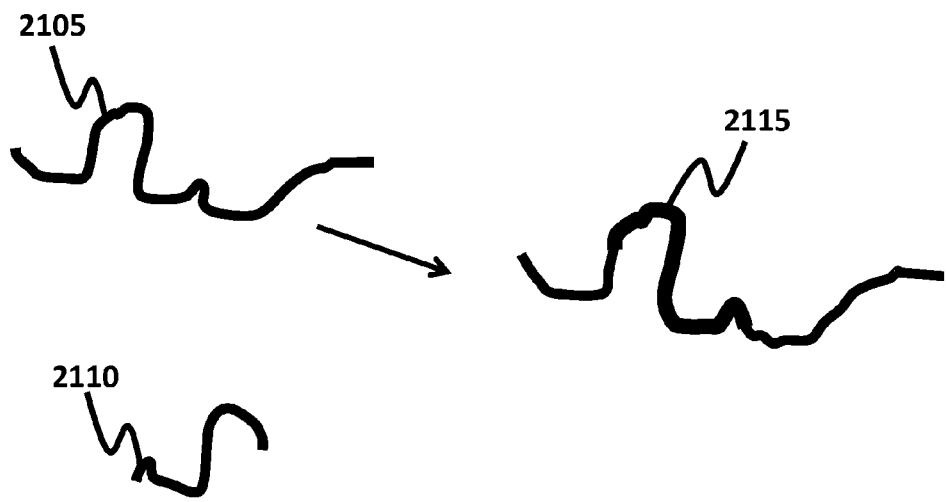
FIG. 21 illustrates feature rotations and feature match.

With regard to feature matching 2015, another process looks at extracted shape features to determine that they are the same as other known features. Two shape feature match candidates, $f_A$ and $f_B$ are compared by taking the shorter length feature $f_B$ and comparing it with the longer candidate feature $f_A$ at different translations, s, along the length of the feature $f_A$ (both forward and reverse). For example, see FIG. 21. The comparison is made by computing the difference in the vector heading changes over the duration of the feature. In the example of FIG. 21, the feature rotations are shown as perfect (curve 2115 is flipped version of 2110) but this is not necessary for a match. Since the vector of heading changes are being compared as the feature (in either direction) is traversed, the differences in the feature rotation do not affect the comparison. For a feature to be considered for a match, it is considered whether the computed difference is found to be smaller than a threshold (here 0.2 radians was chosen) for each element of the feature. If this is true, then a cost is computed that measures the heading variations and normalizes for the length of the feature and the standard deviation of the feature candidates. It is determined whether the cost is less than a threshold (here 1.5)

$$\text{Cost} = \frac{\sum_{i=1}^{n}(f_{Ai} - f_{B(s\pm i)})}{L(\sigma_A + \sigma_B)/2}$$

If the feature candidates satisfy these criteria then a match is declared.

Again, estimates of the inertial track error are used to limit the search space for feature matches. Very tight control may be used to avoid false matches. In one embodiment, the search space accounts for a drift of ±0.001 radians/second (this is a corrected drift since sensor fusion algorithms have already run). So for example, if the user revisits a feature, the drift accumulated since the feature was originally visited will be limited by ±0.001 radians/second applied to the intervening path. Requiring higher quality matching criteria, e.g., the differences between feature vector of heading changes matches over the segment is below some lower threshold, or requiring a more unique features, e.g., more points in the Ramer-Douglas-Peucker algorithm, could reduce the risk in allowing matching when the features have larger location estimate differences. Other sensor signatures could also be compared to increase confidence in potential segment matches. For example, considering the magnetic data along with the heading differences at each point. With regard to correction 2020, if it is concluded that two features might be the same, then constraints are made at the endpoints and midpoint tie the two path segments together. This is enforced in the navigation solution by solving a constraint based optimization for at least one of the path offset, rotation, scale or drift of the result of the sensor fusion process such that the constraints are satisfied as closely as possible.

In tests, it was found useful to down sample the path data before beginning at unique shape feature selection 2010. Down sampling is useful to improve scalability (less computationally intensive) and this coarser view of the data is often helpful in removing unimportant features in the path. A method for adaptive down sampling based on the length of straight segments (less points are needed for longer segments) has been implemented.

Figure 24:
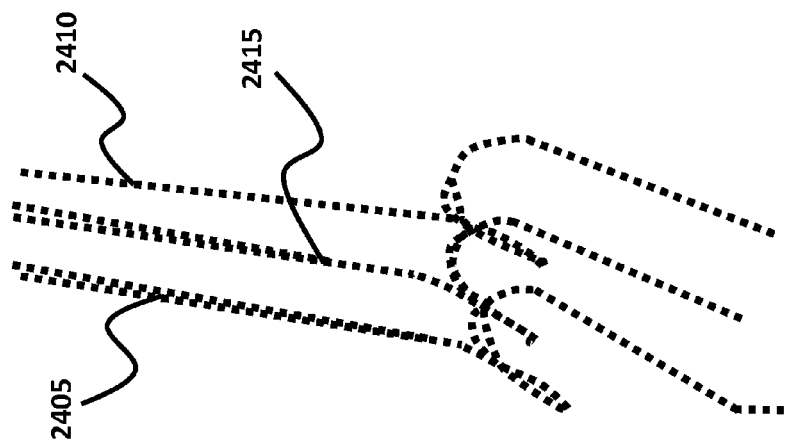
FIG. 24 illustrates a sensor fusion path and a corrected path after constraints have been enforced.
Figure 23:
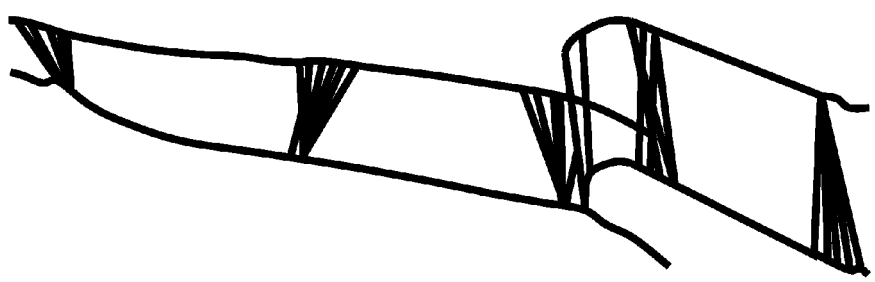
FIG. 23 illustrates the output of the sensor fusion results with constraints drawn between the matches of the discovered unique shape features.
Figure 22:
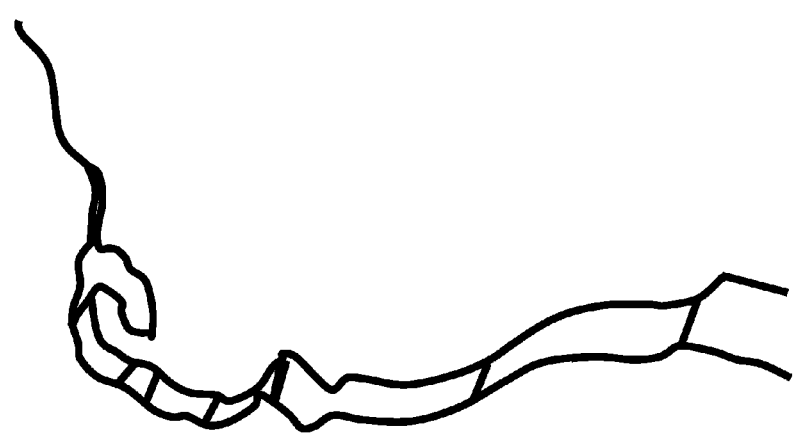
FIG. 22 illustrates the output of the sensor fusion results with constraints drawn between the matches of the discovered unique shape features.

Post processing of data from a cavern test was used to validate the algorithms and compare them to the prior method. Again sensor fusion results in a path with errors remaining relative to the ground truth of FIG. 5. FIGS. 22 and 23 shows two different sections of the output of the sensor fusion results with constraints drawn between the matches of the discovered unique shape features. The lines connect the features at the endpoints and midpoint. FIG. 24 shows the sensor fusion path (lines 2405 and 2410) and the corrected path 2415 after the constraints have been enforced using constraint based optimization to refine parameters for offset, rotation, drift and scale with a near perfect match.

Figure 25:
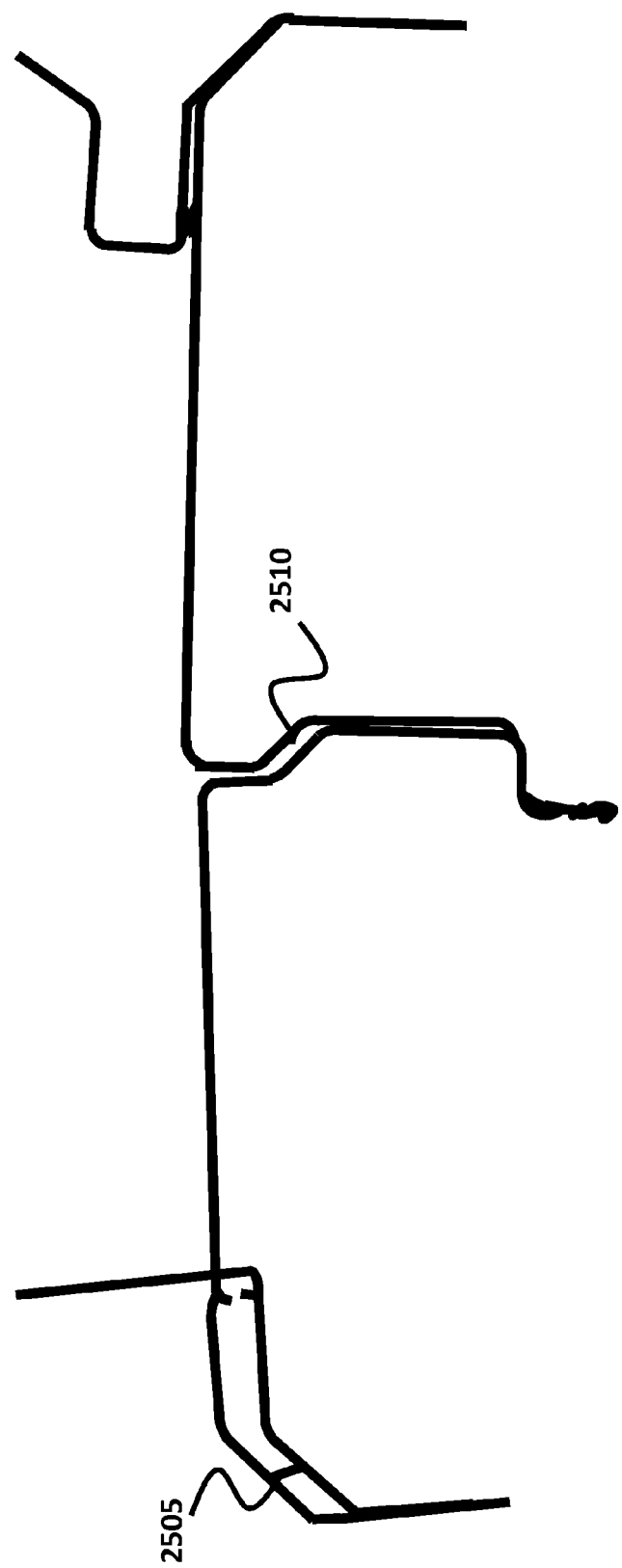
FIG. 25 illustrates the output of the sensor fusion results with constraints drawn between the matches of the discovered unique shape features.
Figure 27:
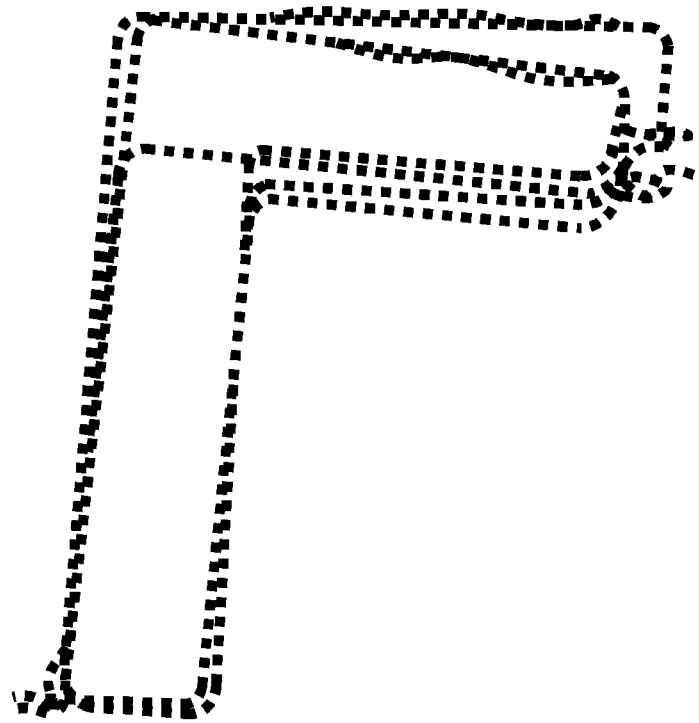
FIG. 27 illustrates a path solution considering FIG. 26 with constraints applied.
Figure 26:
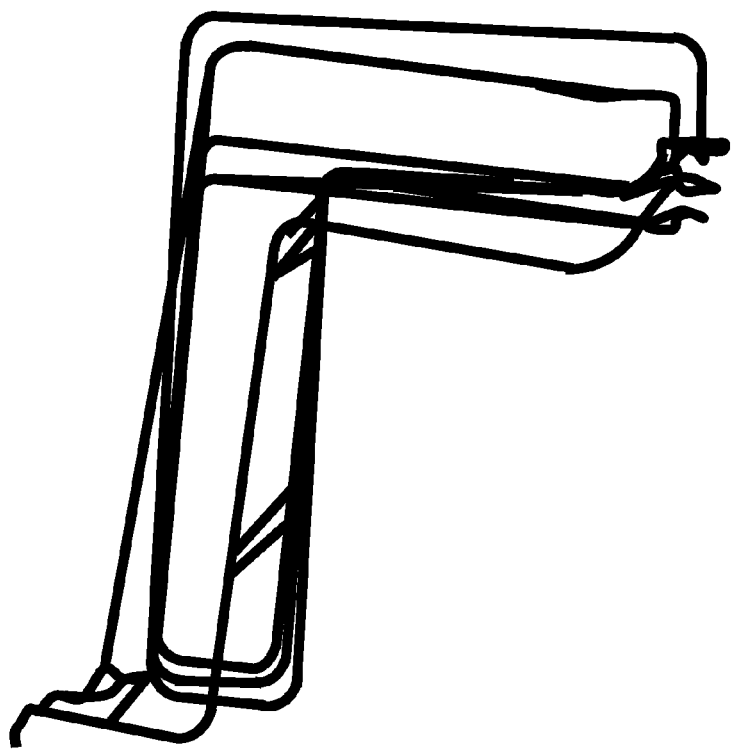
FIG. 26 illustrates the output of the sensor fusion results with constraints drawn between the matches of the discovered unique shape features.

The hierarchical shape matching with reduced complexity algorithm has been tested in real time at an underground test facility. FIG. 25 shows an example of the original track with connecting lines such as lines 2505 and 2510 indicating the connected endpoints and midpoint of the matched feature constraints. The algorithms also apply also in buildings when there is no knowledge of the building outline. FIG. 26 shows the original track and again the connecting lines are constraints. FIG. 27 shows the solution with constraints applied. The true path looks like an "L". The final solution is accurate in some sections but not as accurate in others. Local constraint based optimization is used to apply constraints and sometimes constraints are not able to be found to correct every portion of a path. In this case, inferred building knowledge may be used to help improve the solution. It is not used in this instance, in order to highlight the shape matching.

Figure 28:
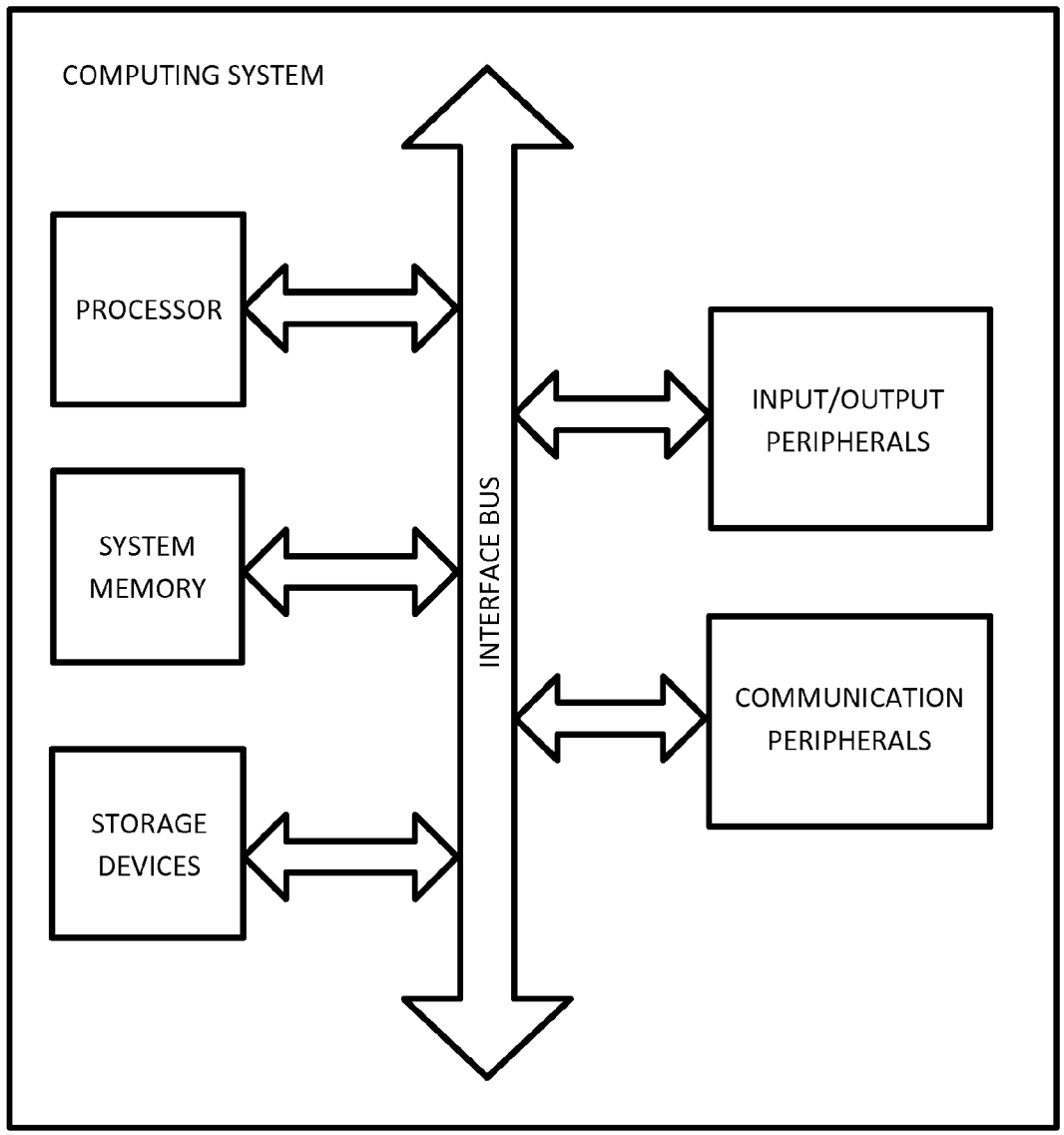
FIG. 28 is an exemplary block diagram representing a general purpose computer system in which aspects of the methods and systems disclosed herein or portions thereof may be incorporated.

The techniques described above can be implemented on a computing device associated with a user (e.g., gyroscope and accelerometer sensors implemented on a device worn by the user), a plurality of computing devices associated with a plurality of users, a server in communication with the computing device(s) (e.g., a server configured to calibrate the gyroscope and accelerometer sensors of the device worn by the user), or a plurality of servers in communication with the computing device(s). Additionally, the techniques may be distributed between the computing device(s) and the server(s). For example, the computing device may collect and transmit raw data to the server that, in turn, process the raw data to improve heading estimation. FIG. 28 illustrates an exemplary block diagram of a computing system that includes hardware modules, software module, and a combination thereof and that can be implemented as the computing device and/or as the server.

In a basic configuration, the computing system may include at least a processor, a system memory, a storage device, input/output peripherals, communication peripherals, and an interface bus. The interface bus is configured to communicate, transmit, and transfer data, controls, and commands between the various components of the electronic device. The system memory and the storage device comprise computer readable storage media, such as RAM, ROM, EEPROM, hard-drives, CD-ROMs, optical storage devices, magnetic storage devices, flash memory, and other tangible storage media. Any of such computer readable storage medium can be configured to store instructions or program codes embodying aspects of the disclosure. Additionally, the system memory comprises an operation system and applications. The processor is configured to execute the stored instructions and can comprise, for example, a logical processing unit, a microprocessor, a digital signal processor, and the like.

The system memory and the storage device may also comprise computer readable signal media. A computer readable signal medium may include a propagated data signal with computer readable program code embodied therein. Such a propagated signal may take any of variety of forms including, but not limited to, electro-magnetic, optical, or any combination thereof. A computer readable signal medium may be any computer readable medium that is not a computer readable storage medium and that can communicate, propagate, or transport a program for use in connection with the computing system.

Further, the input and output peripherals include user interfaces such as a keyboard, screen, microphone, speaker, other input/output devices, and computing components such as digital-to-analog and analog-to-digital converters, graphical processing units, serial ports, parallel ports, and universal serial bus. The input/output peripherals may be connected to the processor through any of the ports coupled to the interface bus.

The user interfaces can be configured to allow a user of the computing system to interact with the computing system. For example, the computing system may include instructions that, when executed, cause the computing system to generate a user interface that the user can use to provide input to the computing system and to receive an output from the computing system.

This user interface may be in the form of a graphical user interface that is rendered at the screen and that is coupled with audio transmitted on the speaker and microphone and input received at the keyboard. In an embodiment, the user interface can be locally generated at the computing system. In another embodiment, the user interface may be hosted on a remote computing system and rendered at the computing system. For example, the server may generate the user interface and may transmit information related thereto to the computing device that, in turn, renders the user interface to the user. The computing device may, for example, execute a browser or an application that exposes an application program interface (API) at the server to access the user interface hosted on the server.

Finally, the communication peripherals of the computing system are configured to facilitate communication between the computing system and other computing systems (e.g., between the computing device and the server) over a communications network. The communication peripherals include, for example, a network interface controller, modem, various modulators/demodulators and encoders/decoders, wireless and wired interface cards, antenna, and the like.

The communication network includes a network of any type that is suitable for providing communications between the computing device and the server and may comprise a combination of discrete networks which may use different technologies. For example, the communications network includes a cellular network, a WiFi/broadband network, a local area network (LAN), a wide area network (WAN), a telephony network, a fiber-optic network, or combinations thereof. In an example embodiment, the communication network includes the Internet and any networks adapted to communicate with the Internet. The communications network may be also configured as a means for transmitting data between the computing device and the server.

The techniques described above may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein. Real-time as discussed herein refers to operations that usually occur in milliseconds, but not more than one second. Near real-time events usually occur within seconds.

What is claimed:

1. A computer-implemented method of tracking a trackee, the method being implemented by a computer that includes a physical processor, the method comprising:
    obtaining tracking data for a tracked subject along a path, the tracking data including data from a dead reckoning sensor; and
    performing shape correction on the tracking data to provide a first estimate of the path, wherein performing shape correction includes describing the path by a set of linear segments with a width less than a series of decreasing thresholds corresponding to coarse shape correction and fine shape correction.

2. The method of claim 1, wherein the dead reckoning sensor is at least one of an inertial sensor, and optical flow sensor, or a Doppler velocimeter.

3. The method of claim 1, wherein the performed shape correction further comprises:
    grouping a set of linear segments into shapes; and
    matching the grouped set of linear segments to a first group of shapes in a threshold proximity.

4. The method of claim 1, further comprising:
    performing fine shape correction to the first estimate of the path that provides a second estimate of the path.

5. The method of claim 4, wherein fine shape correction comprises describing the first estimate of the path by a set of linear segments with width less than a second threshold.

6. A computer-implemented method of tracking a trackee, the method being implemented by a computer that includes a physical processor, the method comprising:

obtaining first tracking data for a first tracked subject along a path, the first tracking data including data from a dead reckoning sensor;

determining a unique shape feature in the first tracking data, wherein determining the unique shape feature includes describing the unique shape feature by more than a threshold of points based on using a Ramer-Douglas-Peucker algorithm for a given epsilon; and determining that the unique shape feature in the first tracking data matches second tracking data for a second tracked subject along the path based on shape matching.

7. The method of claim 6, further comprising:
creating a first estimate of the path based on whether the unique shape feature in the first tracking data matches second tracking data for the second tracked subject along the path.

8. The method of claim 6, wherein the dead reckoning sensor is at least one of an inertial sensor, and optical flow sensor, or a Doppler velocimeter.

9. The method of claim 6, wherein determining the unique shape feature in the first tracking data matches second tracking data for the second tracked subject along the path comprises at least one:
determining a shape feature of the path described by more than a threshold of points based on using the Ramer-Douglas-Peucker algorithm with a parameter epsilon;
determining heading changes over the shape feature of the path are greater than a threshold standard deviation; or
determining a length of the shape feature of the path is greater than a threshold length.

10. The method of claim 6, wherein the unique shape feature is described by a vector of heading changes over a duration of a path feature.

11. The method of claim 6, wherein determining that the unique shape feature in the first tracking data matches the second tracking data for the second tracked subject along the path comprises at least one of:
comparing vectors of heading changes of a plurality of shape match candidates over a duration of a plurality of features; or
determining that a difference at each point in the vectors of heading changes of the plurality of shape match candidates over the duration of the plurality of features is less than a threshold.

12. A computing system used to track a trackee, the computing system comprising:

a dead reckoning sensor;
a processor in communication with the dead reckoning sensor; and
a memory coupled to the processor, the memory having stored thereon executable instructions that when executed by the processor cause the processor to effectuate operations comprising:
obtaining first tracking data for a first tracked subject along a path, the first tracking data including data from the dead reckoning sensor;
determining a unique shape feature in the first tracking data of the first tracked subject, wherein determining the unique shape feature includes describing the unique shape feature by more than a threshold of points based on using a Ramer-Douglas-Peucker algorithm for a given epsilon; and
using shape matching to determine whether the unique shape feature in the tracking data matches second tracking data for a second tracked subject along the path.

13. The computing system of claim 12, wherein the dead reckoning sensor is at least one of an inertial sensor, and optical flow sensor, or a Doppler velocimeter.

14. The computing system of claim 12, wherein determining the unique shape feature in the first tracking data of the first tracked subject comprises at least one:
determining a shape feature of the path described by more than a threshold of points based on using the Ramer-Douglas-Peucker algorithm with a parameter epsilon;
determining heading changes over the shape feature of the path are greater than a threshold standard deviation; or
determining a length of the shape feature of the path is greater than a threshold length.

15. The computing system of claim 12, wherein the unique shape feature is described by a vector of heading changes over a duration of a path feature.

16. The computing system of claim 12, wherein determining the unique shape feature in the first tracking data of the first tracked subject matches second tracking data for the second tracked subject along the path comprises:
comparing heading changes of vectors of a plurality of shape match candidates over a duration of features; and
determining that a difference at each point in the vectors is less than a threshold.

* * * * *

UNITED STATES PATENT AND TRADEMARK OFFICE
CERTIFICATE OF CORRECTION

PATENT NO.        : 9,441,973 B2
APPLICATION NO.   : 13/916487
DATED             : September 13, 2016
INVENTOR(S)       : Amrit Bandyopadhyay et al.

It is certified that error appears in the above-identified patent and that said Letters Patent is hereby corrected as shown below:

In the Specification

Column 1, Lines 13 through 17, delete:
"The subject matter disclosed herein was made with government support under contract number DARPA SBIR Phase II – W31P4Q-10-C-0166 awarded by the Defense Advanced Research Projects Agency. The Government may have certain rights in the herein disclosed subject matter."

And insert:
--This invention was made with Government support under DARPA SBIR Phase II – W31P4Q-10-C-0166, awarded by Defense Advanced Research Projects Agency. The Government has certain rights in the invention.--, therefor.

Signed and Sealed this
Sixteenth Day of May, 2017

Michelle K. Lee
*Director of the United States Patent and Trademark Office*